(12) United States Patent
Sun et al.

(10) Patent No.: US 11,272,473 B2
(45) Date of Patent: Mar. 8, 2022

(54) METHOD AND APPARATUS FOR TIMING ADVANCE ADJUSTMENT

(71) Applicant: LENOVO (BEIJING) LIMITED, Beijing (CN)

(72) Inventors: Zhennian Sun, Beijing (CN); Haipeng Lei, Beijing (CN); Hongmei Liu, Beijing (CN); Chenxi Zhu, Fairfax, VA (US)

(73) Assignee: LENOVO (BEIJING) LIMITED, Beijing (CN)

( * ) Notice: Subject to any disclaimer, the term of this patent is extended or adjusted under 35 U.S.C. 154(b) by 21 days.

(21) Appl. No.: 16/968,208

(22) PCT Filed: Feb. 9, 2018

(86) PCT No.: PCT/CN2018/076024
§ 371 (c)(1),
(2) Date: Aug. 7, 2020

(87) PCT Pub. No.: WO2019/153255
PCT Pub. Date: Aug. 15, 2019

(65) Prior Publication Data
US 2020/0396709 A1    Dec. 17, 2020

(51) Int. Cl.
*H04W 56/00* (2009.01)
*H04L 5/00* (2006.01)
(Continued)

(52) U.S. Cl.
CPC ....... *H04W 56/0045* (2013.01); *H04L 5/0051* (2013.01); *H04L 5/10* (2013.01);
(Continued)

(58) Field of Classification Search
CPC . H04W 56/0045; H04W 8/24; H04W 56/001; H04W 74/0833; H04W 80/02; H04L 5/0051; H04L 5/10
(Continued)

(56) References Cited

U.S. PATENT DOCUMENTS

| | | | |
|---|---|---|---|
| 8,730,854 B2* | 5/2014 | Luo | H04L 27/2607 370/310 |
| 9,763,208 B2* | 9/2017 | Park | H04W 56/0015 |
| 2004/0042387 A1* | 3/2004 | Geile | H04L 43/0829 370/206 |

(Continued)

FOREIGN PATENT DOCUMENTS

| | | |
|---|---|---|
| EP | 3035765 A1 | 6/2016 |
| WO | 2014130082 A1 | 8/2014 |

(Continued)

OTHER PUBLICATIONS

PCT/CN2018/076024, "International Search Report and the Written Opinion of the International Search Authority" ISA/CN, State Intellectual Property Office of the P.R. China, Oct. 19, 2018, pp. 1-6.

(Continued)

*Primary Examiner* — Nghi H Ly
(74) *Attorney, Agent, or Firm* — Kunzler Bean & Adamson (57) ABSTRACT

The present disclosure relates to methods and apparatuses timing advance adjustment. According to some embodiments of the disclosure, a method includes: receiving a timing advance command; determining a timing advance adjustment gap based on the received timing advance command, wherein the timing advance adjustment gap is k symbols, and k is a nature number larger than one; applying the corresponding adjustment of uplink transmission timing from k symbols later than the end of the physical channel carrying the timing advance command.

20 Claims, 5 Drawing Sheets

(51) Int. Cl.
   *H04L 5/10*    (2006.01)
   *H04W 8/24*    (2009.01)
   *H04W 74/08*   (2009.01)
   *H04W 80/02*   (2009.01)

(52) U.S. Cl.
   CPC ........... *H04W 8/24* (2013.01); *H04W 56/001* (2013.01); *H04W 74/0833* (2013.01); *H04W 80/02* (2013.01)

(58) Field of Classification Search
   USPC ................ 370/329, 328, 338, 341, 345, 350
   See application file for complete search history.

(56) References Cited

U.S. PATENT DOCUMENTS

2013/0244719 A1   9/2013   Nukala et al.
2020/0260495 A1*  8/2020   Kim .................... H04W 74/006

FOREIGN PATENT DOCUMENTS

| WO | 2014130115 A1 | 8/2014 |
| WO | 2016165625 A1 | 10/2016 |
| WO | 2017168400 A1 | 10/2017 |

OTHER PUBLICATIONS

Huawei, Hisilicon, Discussion on UE behaviour after measurement gap for R12, 3GPP TSG-RAN WG4 Meeting #70, R4-140171, Feb. 10-14, 2014, pp. 1-17, Prague, Czech.

* cited by examiner

METHOD AND APPARATUS FOR TIMING ADVANCE ADJUSTMENT

TECHNICAL FIELD

The present disclosure is related to wireless communication technology, and more particularly, related to timing advance adjustment during wireless communication.

BACKGROUND

In a long term evolution (LTE)/LTE-Advanced (LTE-A) system, an important feature of uplink transmission is the orthogonal multiple access of different user equipments (UEs), so that the uplink transmission of different UEs within the same cell are not interfered with each other if the signal arrival time of different UEs are the same. To avoid intra-cell interference, base stations require that the signal arrival time of the different UEs from the same subframe with different resource blocks is substantially aligned with each other on the time. In order to ensure the time synchronization of the receiving side, i.e., the base station side, a mechanism of uplink timing advance is introduced into the LTE system.

Specifically, the timing advance mechanism is used to control uplink transmission timing. Network keeps measuring the time difference between uplink transmission, such as physical uplink shared channel (PUSCH)/physical uplink control channel (PUCCH)/sounding reference signal (SRS) reception from different UEs and the subframe time and then sends a 'timing advance' command to the UEs, which need to adjust its uplink transmission timing to make it be better aligned with the subframe timing at the network side. For example, for a UE far away from the base station, it is necessary to transmit the uplink data earlier than another UE near the base station due to a larger transmission delay.

However, the current timing advance mechanism for conventional LTE systems is not adaptive to the new generation communication system, for example, the fifth generation (5G) communication system. Thus, the industry desires a new timing advance solution for the new generation communication system.

SUMMARY OF THE DISCLOSURE

According to an embodiment of the present disclosure, a method includes: receiving a timing advance command; determining a timing advance adjustment gap based on the received timing advance command, wherein the timing advance adjustment gap is k symbols, and k is a nature number larger than one; and applying the corresponding adjustment of uplink transmission timing from k symbols later than the end of the physical channel carrying the timing advance command.

In another embodiment of the present disclosure, the timing advance adjustment gap $$k = \text{ceiling}\left(\frac{\Delta}{T_{symbol}}\right),$$

$\Delta$ is a timing advance adjustment gap in time level, and $T_{symbol}$ is a length of symbol with respect to a subcarrier spacing of uplink transmission such as PUSCH/PUCCH/SRS. According to an embodiment of the present disclosure, the timing advance command may be received from Msg2 during a random access procedure, wherein $\Delta$ is the sum of UE physical downlink shared channel (PDSCH) processing time, UE PUSCH preparation time, media access control (MAC) processing time and a time advance value. According to another embodiment of the present disclosure, the timing advance command may be received from a MAC control element (CE) in PDSCH, wherein $\Delta$ is the sum of UE PDSCH processing time, MAC processing time and a time advance value.

Embodiments of the present disclosure also provide an apparatus. In an embodiment of the present disclosure, the apparatus includes: a receiver that receives a timing advance command; a processor coupled to the receiver that determines a timing advance adjustment gap based on the received timing advance command, wherein the timing advance adjustment gap is k symbols, and k is a nature number larger than one; and a transmitter coupled to the processor that applies the corresponding adjustment of uplink transmission timing from k symbols later than the end of the physical channel carrying the timing advance command.

Embodiments of the present disclosure provide a method and apparatus for timing advance adjustment, which can solve the technical problem of timing advance adjustment in the new generation communication, and thus can facilitate the development and application of the new generation communication.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope.

DETAILED DESCRIPTION

The detailed description of the appended drawings is intended as a description of the currently preferred embodiments of the present disclosure, and is not intended to represent the only form in which the present disclosure may be practiced. It is to be understood that the same or equivalent functions may be accomplished by different embodiments that are intended to be encompassed within the spirit and scope of the present disclosure.

Figure 1:
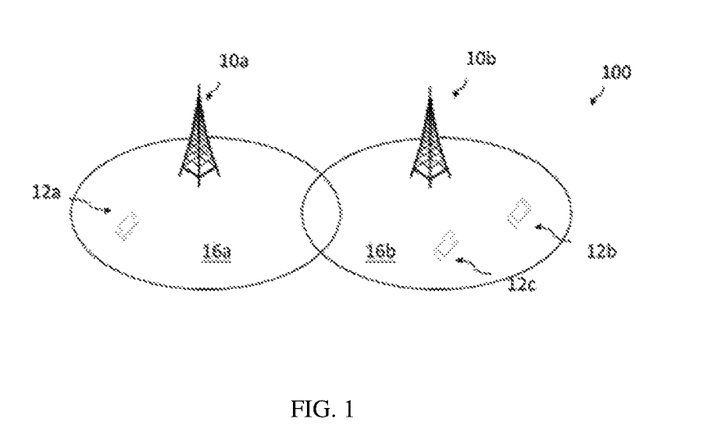
FIG. 1 illustrates a schematic view of a wireless communication system according to an embodiment of the present disclosure.

FIG. 1 illustrates a schematic view of a wireless communication system 100 according to an embodiment of the present disclosure.

As shown in FIG. 1, the wireless communication system 100 includes a plurality of base stations including base stations 10a and 10b, and a plurality of UEs including UEs 12a, 12b and 12c. The plurality of base stations 10a, 10b may be based on the standards of 3G, long-term evolution (LTE), LTE-Advanced (LTE-A), 4G, new radio (NR), or other suitable standards. For example, the plurality of base stations 10a, 10b may be a plurality of eNBs, or a plurality of gNBs. In some embodiments of the disclosure, the plurality of base stations 10a, 10b may be controlled by a control unit (not shown in FIG. 1, e.g. a server, a processor, a computer or the like). Each of the base stations 10a, 10b may define one or more cells, such as cell 16a or 16b, and each cell may support mobility management through the radio resource control (RRC) signaling. A group of cells 16a, 16b may form a radio access network-based (RAN-based) notification area (RNA). The UE 12a, 12b or 12c may be a computing device, a wearable device, and a mobile device, etc.

In a LTE or LTE-A or 5G system, the base station 10b may transmit a timing advance command to UE 12b or UE 12c to change the uplink transmission time of UE 12b or UE 12c, and then the UE 12b or UE 12c may apply the timing advance value determined based on the timing advance command to perform following uplink transmission. In the current specification TS38.213, V15.0.0, the uplink transmission timing adjustment gap, i.e., timing adjustment delay is defined as following: for a timing advance command received on slot n, the corresponding adjustment of the uplink transmission timing applies from the beginning of slot n+6. However, the above timing adjustment gap, i.e., 6 slots is not suitable for the NR networks.

Embodiments of the present disclosure propose a technical solution for timing advance adjustment, which can at least solve the technical problem concerning timing advance adjustment in the new generation communication systems, such as 5G communication systems. According to an embodiment of the present disclosure, a method for timing advance adjustment includes: receiving a timing advance command; determining a timing advance adjustment gap based on the received timing advance command, wherein the timing advance adjustment gap is k symbols, and k is a nature number larger than one; and applying the corresponding adjustment of uplink transmission timing from k symbols later than the end of the physical channel carrying the timing advance command.

More details on the embodiments of the present disclosure will be illustrated in the following text in combination with the appended drawings.

Figure 2:
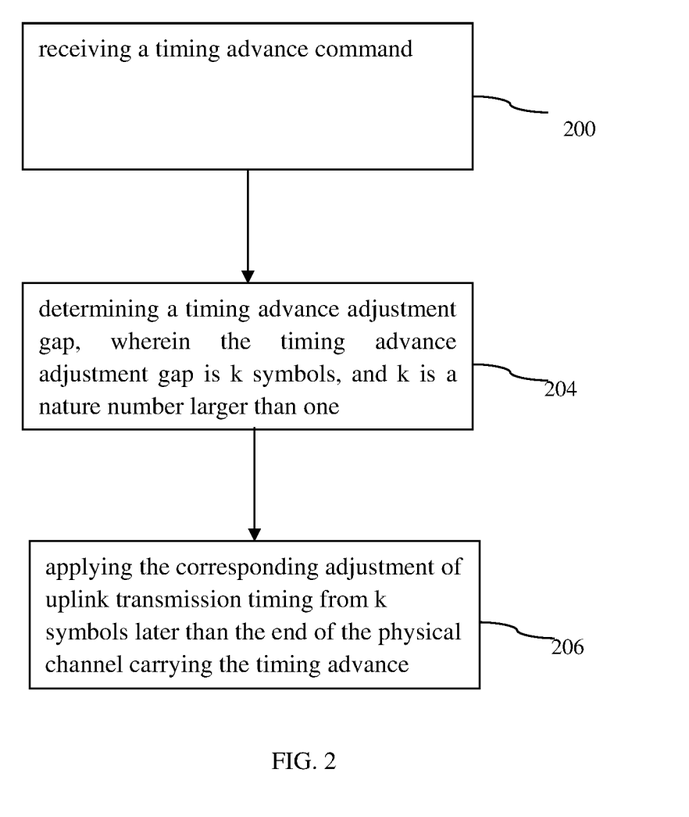
FIG. 2 illustrates a flow chart of a method for the timing advance adjustment according to an embodiment of the present disclosure.

FIG. 2 illustrates a flow chart of a method for timing advance adjustment according to an embodiment of the present disclosure, which can be performed in an apparatus, such as an UE.

As shown in FIG. 2, in step 200, a timing advance command may be received at an apparatus, for example, an UE, which may be transmitted in a physical channel from a base station. More specifically, the timing advance command may be received in different scenarios, such as being received from Msg2 during random access procedure, for example the Physical Random Access Channel (PRACH) procedure, or being received from a MAC CE in PDSCH. In step 202, a timing advance adjustment gap may be determined by an apparatus, for example, the UE based on the received timing advance command, wherein the timing advance adjustment gap is k symbols, and k is a nature number larger than one. Dependent on different scenarios, the timing advance adjustment gap may be determined based on identical or different solutions, which will be illustrated with examples in details in the following text. Then, in step 204, the corresponding adjustment of uplink transmission timing may be applied by an apparatus, for example the UE from k symbols later than the end of the physical channel carrying the timing advance command. Thus, the granularity of timing advance adjustment gap is in symbol level according to embodiments of the present disclosure, which can be adaptive to the mini-slot transmission in NR.

Figure 3:
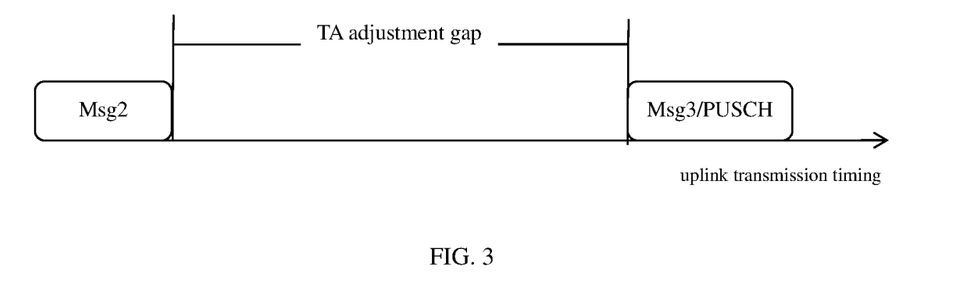
FIG. 3 illustrates an example scenario for a method for timing advance adjustment according to an embodiments of the present disclosure.

FIG. 3 illustrates an example scenario for a method for timing advance adjustment according to an embodiment of the present disclosure.

As shown in FIG. 3, a timing advance command may be received from Msg2 during a random access procedure. Msg2 is a message generated during a random access procedure, which may be sent from the base station and is defined in Section 8 of TS38.213 specified by 3GPP (3rd Generation Partnership Project). A timing advance adjustment gap may be determined based on the received timing advance command. The determined timing advance adjustment gap may be k symbols, and k is a nature number larger than one. In an embodiment of the present disclosure, k may be determined based on the function, $$k = \text{ceiling}\left(\frac{\Delta}{T_{symbol}}\right).$$

$\Delta$ is a timing advance adjustment gap in time level, and $T_{symbol}$ is a length of symbol with respect to a subcarrier spacing (SCS) of uplink transmission.

More specifically, according to an embodiment of the present disclosure, the timing advance adjustment gap in time level, i.e., $\Delta$ may be the sum of UE PDSCH processing time, UE PUSCH preparation time, MAC processing time, and a timing advance value. The UE PDSCH processing time may be determined by a UE capability and a PDSCH Demodulation Reference Signal (DMRS) configuration. For example, the UE capability may be the weakest UE capability like UE capability #1. The PDSCH DMRS configuration may be a front loaded DMRS plus additional DMRS configuration. The UE PUSCH preparation time may also be determined by a UE capability, for example, the weakest UE capability like UE capability #1.

In an embodiment of the present disclosure, the UE PDSCH processing time may be determined based on Tables 1 and 2 as shown below, wherein Tables 1 and 2 are respectively the same as Tables 5.3-1 and 5.3-2 defined in TS38.214 specified by 3GPP. Specifically, Table 1 is about the UE PDSCH processing time with UE capability #1, and Table 2 is about the UE PDSCH processing time with UE capability #2. The parameter "No Additional PDSCH DM-RS configured" represents the front loaded DMRS configuration, while the parameter "Additional PDSCH DM-RS configured" represents the front loaded DMRS configuration plus additional DMRS configuration. $\mu_{DL}$ represents the identification of subcarrier spacing (SCS), which is defined in TS38.211 specified by 3GPP. The UE PDSCH processing time in symbol level is represented as $N_1$, which is also called PDSCH decoding time in the Tables.

TABLE 1

PDSCH processing time for PDSCH processing capability 1

PDSCH decoding time $N_1$ [symbols]

| $\mu_{DL}$ | No additional PDSCH DM-RS configured | Additional PDSCH DM-RS configured |
|---|---|---|
| 0 | 8 | 13 |
| 1 | 10 | 13 |
| 2 | 17 | 20 |
| 3 | 20 | 24 |

TABLE 2

PDSCH processing time for PDSCH processing capability 2

PDSCH decoding time $N_1$ [symbols]

| $\mu_{DL}$ | No additional PDSCH DM-RS configured | Additional PDSCH DM-RS configured |
|---|---|---|
| 0 | [2.5-4] | [12] |
| 1 | [2.5-6] | [12] |

Accordingly, the UE PDSCH processing time may be a predefined value considering the UE capability and PDSCH DMRS configuration. For example the UE PDSCH processing time may be a predefined value with the front loaded DMRS plus additional DMRS configuration and the weakest UE capability like UE capability #1. The predefined value may be determined based on Tables 5.3-1 and 5.3-2 defined in TS38.214.

Similarly, in an embodiment of the present disclosure, the UE PUSCH preparation time may be determined based on Tables 3 and 4 as shown below, wherein Tables 3 and 4 are respectively the same as Tables 6.4-1 and 6.4-2 defined in TS38.214 specified by 3GPP. Specifically, Table 3 is about the UE PUSCH preparation time with UE capability #1, and Table 2 is about the UE PUSCH preparation time with UE capability #2. The UE PUSCH preparation time in symbol level is represented as $N_2$.

TABLE 3

PUSCH preparation time for PUSCH timing capability 1

| $\mu_{DL}$ | PUSCH preparation time $N_2$ [symbols] |
|---|---|
| 0 | 10 |
| 1 | 12 |
| 2 | 23 |
| 3 | 36 |

TABLE 4

PUSCH preparation time for PUSCH timing capability 2

| $\mu_{DL}$ | PUSCH preparation time $N_2$ [symbols] |
|---|---|
| 0 | [2.5-6] |
| 1 | [2.5-6] |

Accordingly, the UE PUSCH preparation time may be a predefined value considering the UE capability. For example, the UE PUSCH preparation time may be a predefined value with the weakest UE capability like UE capability #1. The predefined value may be determined based on Tables 6.4-1 and 6.4-2 defined in TS38.214.

Based on Tables 1-4, according to an embodiment of the present disclosure, the timing advance adjustment gap in time level, i.e., Δ may be represented as Δ=duration of $N_1$+duration of $N_2$+L2+TA. Wherein, duration of $N_1$ means converting $N_1$, i.e., the UE PUSCH processing time in symbol level into time level, duration of $N_2$ means converting $N_2$, i.e., the UE PUSCH preparation time in symbol level into time level, L2 represents the MAC processing time, and TA represents a timing advance value. In an embodiment of the present disclosure, L2 may be a default value, e.g., 500 us, and TA may be the maximum timing advance value within a predefined range provided by a timing advance command. Similar to Msg 2, Msg3 is also a message generated during a random access procedure, and is defined in Section 8 of TS38.213 specified by 3GPP. However, Msg3 is sent from an UE to a base station. TA may be $3846*16*64*T_c/2^{\mu_{UL}}$, wherein $T_c$ and $u_{UL}$ are both defined in TS38.211 specified by 3GPP, $T_c$ is a time unit, and $u_{UL}$ is a subcarrier spacing configuration for PUSCH/PUCCH/SRS. According to an embodiment of the present disclosure, the range of TA may be $([0:3846]+[-31:32])*16*64T_c/2^{\mu_{UL}}$, which is from 0 to 28.30657 symbols. The timing advance command may be transmitted with 12 bit.

For the determined timing advance adjustment gap, it may be applied to the corresponding adjustment of uplink transmission timing from k symbols later than the end of the physical channel carrying the timing advance command. According to an embodiment of the present disclosure, the uplink transmission may be PUSCH transmission or Msg3 during the random access procedure. Depending on the time when an uplink transmission occurs, the timing advance adjustment gap may be applied to the corresponding adjustment of uplink transmission timing from the beginning of the end of the physical adjustment carrying the timing advance command plus the timing advance adjustment gap, i.e., k symbols; or from the beginning of the end of the physical adjustment carrying the timing advance command plus more symbols than the determined k symbols.

Figure 4:
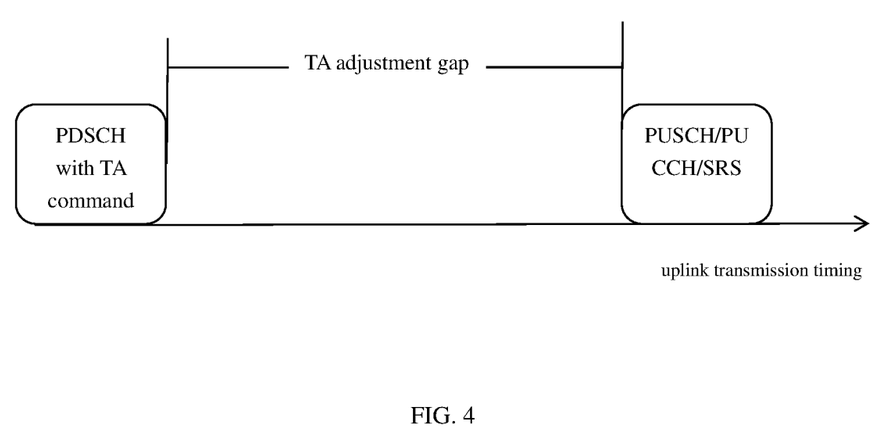
FIG. 4 illustrates another example scenario for a method for timing advance adjustment according to another embodiment of the present disclosure.

FIG. 4 illustrates another example scenario for a method for timing advance adjustment according to another embodiment of the present disclosure, wherein the timing advance command may be received from MAC CE in PDSCH.

In response to receiving a timing advance command from MAC CE in PDSCH, a timing advance adjustment gap based on the received timing advance command may be determined, wherein the timing advance adjustment gap is k symbols, and k is a nature number larger than one. In an embodiment of the present disclosure, the timing advance adjustment gap, i.e., k may be determined by a function, i.e., $$k = \text{ceiling}\left(\frac{\Delta}{T_{symbol}}\right).$$

Δ is a timing advance adjustment gap in time level, and $T_{symbol}$ is a length of symbol with respect to a subcarrier spacing of uplink transmission.

According to an embodiment of the present disclosure, the timing advance adjustment gap in time level, i.e., Δ may be the sum of UE PDSCH processing time, MAC processing time and a timing advance value. The UE PDSCH processing time may be determined by a UE capability and a PDSCH DMRS configuration.

In an embodiment of the present disclosure, the timing advance adjustment gap may be common for all UEs controlled by the same base station. The UE capability may be the weakest UE capability, for example UE capability #1. The PDSCH DMRS configuration may be a front loaded DMRS plus additional DMRS configuration. Accordingly, the UE PDSCH processing time may be determined based on Tables 5.3-1 and 5.3-2 defined in TS38.214.

In another embodiment of the present disclosure, the timing advance adjustment gap may be UE specified. That is, the timing advance adjustment gap may be different for different UEs. The UE PDSCH processing time depends on the capability and PDSCH DMRS configuration of a corresponding UE. The corresponding UE is in a CONNECTED mode, and reports its capability to the base station. The PDSCH DMRS configuration may be a front loaded DMRS configuration or a front loaded DMRS plus additional DMRS configuration. According to an embodiment of the present disclosure, the UE PDSCH processing time may be determined based on Tables 5.3-1 and 5.3-2 defined in TS38.214.

Accordingly, the UE PDSCH processing time may be a predefined value considering the UE capability and PDSCH DMRS configuration. For example, in response to the timing advance adjustment gap is common for all UEs, the UE PDSCH processing time may be a predefined value with the front loaded DMRS plus additional DMRS configuration and the weakest UE capability like UE capability #1. In another example, in response to the timing advance adjustment gap is UE specified and the UE reports its capability as UE capability #2, the UE PDSCH processing time may be a predefined value with the front loaded DMRS configuration and UE capability #2, or a predefined value with the front loaded DMRS plus additional DMRS configuration and UE capability #2. The predefined value may be determined based on Tables 5.3-1 and 5.3-2 defined in TS38.214.

Based on Tables 1-2, according to an embodiment of the present disclosure, the timing advance adjustment gap in time level, i.e., $\Delta$ may be represented as $\Delta$=duration of $N_1$+L2+TA. Wherein, duration of $N_1$ means converting $N_1$, i.e., the UE PUSCH processing time in symbol level into time level, L2 represents the MAC processing time, and TA represents a timing advance value. In an embodiment of the present disclosure, L2 may be a default value, e.g., 500 us.

According to an embodiment of the present disclosure, in response to the timing advance adjustment gap being common to all UEs controlled by the same base station, TA may be the maximum timing advance value within a predefined range provided by a timing advance command. The timing advance command may be transmitted with 12 bit. For example, TA may be $3846*16*64*T_c/2^{u_{UL}}$, wherein $T_c$ and $u_{UL}$ are both defined in TS38.211 specified by 3GPP, $T_c$ is a time unit, and $u_{UL}$ is a subcarrier spacing configuration for PUSCH/PUCCH/SRS. According to an embodiment of the present disclosure, the range of TA may be ([0:3846]+[−31:32])$*16*64T_c/2^{u_{UL}}$, which is from 0 to 28.30657 symbols.

According to another embodiment of the present disclosure, in response to the timing advance adjustment gap being UE specified, TA of each UE may be keep being updated during the communication procedure. The updated TA may be represented as $N_{TA}$, the previous TA may be represented as $N_{TA\_old}$, and $N_{TA}=N_{TA\_old}+(T_A-31)*16*64/2^{u_{UL}}$. Wherein $u_{UL}$ is a subcarrier spacing configuration for uplink transmission defined in TS38.211, $T_A$ is a time variable and can be represented as $N_{TA}T_c$. The range of $N_{TA}$ may be ([0:3846]+[−31:32])$*16*64T_c/2^{u_{UL}}$, which is from 0 to 28.30657 symbols. Accordingly, by changing TA into $N_{TA}$, the timing advance adjustment gap, i.e., $\Delta$ may be represented as $\Delta=(N_1*(2028+144)*C_{scs}+N_{TA})*T_c+L2$, wherein $C_{scs}$ is defined in TS38.211 specified by 3GPP, for example, $C_{scs}=64*2^{-u_{DL}}$.

As shown in FIG. 4, in response to the determined timing advance adjustment, the corresponding adjustment of uplink transmission timing may be applied from k symbols later than the end of the physical channel carrying the timing advance command. The uplink transmission may be PUSCH transmission, PUCCH transmission or SRS transmission. Depending on the time when an uplink transmission occurs, the timing advance adjustment gap may be applied to the corresponding adjustment of uplink transmission timing from the beginning of the end of the physical adjustment carrying the timing advance command plus the timing advance adjustment gap, i.e., k symbols; or from the beginning of the end of the physical adjustment carrying the timing advance command plus more symbols than the determined k symbols.

Embodiments of the present disclosure also provide examples of timing advance adjustment gaps considering UE capabilities, PDSCH DMRS configuration, the subcarrier spacing of PDSCH and the subcarrier spacing of PUSCH, which are listed in Tables 5-1 and 5-2. Wherein Table 5-1 is related to timing advance adjustment gaps with UE capability #1, and Table 5-2 is related to timing advance adjustment gaps with UE capability #2.

TABLE 5-1

| | Timing advance adjustment gaps with UE capability #1 | | | | | | | | |
|---|---|---|---|---|---|---|---|---|---|
| | Front-loaded DMRS only | | | | | | | | Front-loaded DMRS + additional DMRS |
| SCS of PDSCH(kHz) | 15 | | 30 | | 60 | | 120 | | 15 |
| N1(symbols) | 8 | | 10 | | 17 | | 20 | | 13 |
| SCS of PUSCH(kHz) | 15 | 30 | 15 | 30 | 60 | 120 | 60 | 120 | 15 |
| $\Delta$ = N1 + L2 + TA (symbols respect to SCS of PUSCH) | 15~43.3 | 30~58.3 | 12~40.3 | 24~52.3 | 45~73.3 | 90~118.3 | 38~66.3 | 76~104.3 | 20~48.3 |
| k = ceiling($\Delta$/$T_{symbol}$) | 15-44 | 30~59 | 12~41 | 24~53 | 45~74 | 90~119 | 38~67 | 76~105 | 20~49 |

TABLE 5-1-continued

Timing advance adjustment gaps with UE capability #1

| | | Front-loaded DMRS + additional DMRS | | | | | | |
|---|---|---|---|---|---|---|---|---|
| SCS of PDSCH(kHz) | 15 | | 30 | | 60 | | 120 | |
| N1(symbols) | 13 | | 13 | | 20 | | 24 | |
| SCS of PUSCH(kHz) | 30 | 15 | 30 | 60 | 120 | 60 | 120 | |
| $\Delta$ = N1 + L2 + TA (symbols respect to SCS of PUSCH) | 40~68.3 | 13.5-41.8 | 27~55.3 | 48~76.3 | 96~124.3 | 40~68.3 | 80~108.3 | |
| k = ceiling($\Delta$/$T_{symbol}$) | 40~69 | 14~42 | 27~58 | 48~77 | 96~125 | 40~69 | 80~109 | |

TABLE 5-2

Timing advance adjustment gaps with UE capability #2

| | Front-loaded DMRS only | | | | Front-loaded DMRS + additional DMRS | | | |
|---|---|---|---|---|---|---|---|---|
| | 15 KHz SCS | | 30 KHz SCS | | 15 KHz SCS | | 30 KHz SCS | |
| SCS of PDSCH | | | | | | | | |
| N1(symbols) | [4] | | [6] | | 12 | | 12 | |
| SCS of PUSCH | 15 KHz SCS | 30 KHz SCS | 15 KHz SCS | 30 KHz SCS | 15 KHz SCS | 30 KHz SCS | 15 KHz SCS | 30 KHz SCS |
| $\Delta$ = N1 + L2 + TA (symbols respect to SCS of PUSCH) | 11~39.3 | 22~50.3 | 10~38.3 | 20~48.3 | 19~47.3 | 38~66.3 | 13~41.3 | 26~56.3 |
| k = ceiling($\Delta$/$T_{symbol}$) | 11-40 | 22~51 | 10~39 | 21~49 | 19~48 | 38~67 | 13~42 | 26~57 |

Embodiments of the present disclosure also provide an apparatus for timing advance adjustment. The apparatus may include: a receiver that receives a timing advance command; a processor coupled to the receiver that determines a timing advance adjustment gap based on the received timing advance command, wherein the timing advance adjustment gap is k symbols, and k is a nature number larger than one; a transmitter coupled to the processor that applies the corresponding adjustment of uplink transmission timing from k symbols later than the end of the physical channel carrying the timing advance command.

Figure 5:
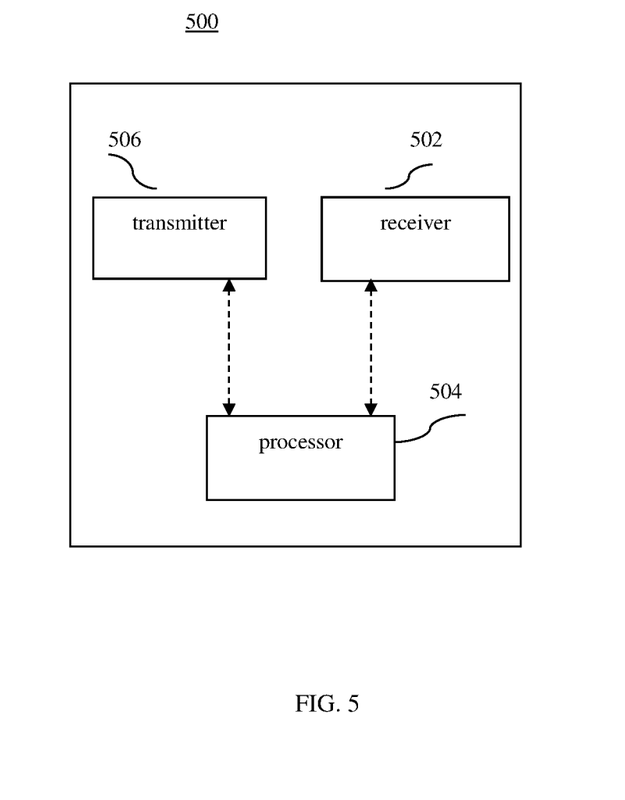
FIG. 5 illustrates a block diagram of an apparatus for timing advance adjustment according to an embodiment of the present disclosure.

FIG. 5 a block diagram of an apparatus for timing advance adjustment according to an embodiment of the present disclosure.

Referring to FIG. 5, the apparatus 500, for example an UE, may include a receiver 502, a processor 504 and a transmitter 506. The receiver 502 may receive a timing advance command, for example, from Msg2 or a MAC CE in PDSCH. The processor 504 may be coupled to the receiver 502. The processor 504 may determine a timing advance adjustment gap based on the received timing advance command, wherein the timing advance adjustment gap is k symbols, and k is a nature number larger than one. The transmitter 506 may be coupled to the processor 504. The transmitter 506 may apply the corresponding adjustment of uplink transmission timing from k symbols later than the end of the physical channel carrying the timing advance command.

The method according to embodiments of the present application can also be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this application. For example, an embodiment of the present application provides an apparatus for emotion recognition from speech, including a processor and a memory. Computer programmable instructions for implementing a method for emotion recognition from speech are stored in the memory, and the processor is configured to perform the computer programmable instructions to implement the method for emotion recognition from speech. The method may be a method as stated above or other method according to an embodiment of the present application.

An alternative embodiment preferably implements the methods according to embodiments of the present application in a non-transitory, computer-readable storage medium storing computer programmable instructions. The instructions are preferably executed by computer-executable components preferably integrated with a network security system. The non-transitory, computer-readable storage medium may be stored on any suitable computer readable media such as RAMs, ROMs, flash memory, EEPROMs, optical storage devices (CD or DVD), hard drives, floppy drives, or any suitable device. The computer-executable component is preferably a processor but the instructions may alternatively or additionally be executed by any suitable dedicated hardware device. For example, an embodiment of the present application provides a non-transitory, computer-readable storage medium having computer programmable instructions stored therein. The computer programmable instructions are configured to implement a method for emotion recognition from speech as stated above or other method according to an embodiment of the present application.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

What is claimed is:

1. A method, comprising:
receiving a timing advance command;
determining a timing advance adjustment gap based on the received timing advance command, wherein the timing advance adjustment gap is k symbols, and k is a nature number larger than one; and
applying the corresponding adjustment of uplink transmission timing from k symbols later than the end of the physical channel carrying the timing advance command.

2. The method of claim 1, wherein $$k = \text{ceiling}\left(\frac{\Delta}{T_{symbol}}\right),$$

$\Delta$ is a timing advance adjustment gap in time level, and Tsymbol is a length of symbol with respect to a subcarrier spacing of uplink transmission.

3. The method of claim 2, wherein the timing advance command is received from message 2 during a random access procedure.

4. The method of claim 3, wherein $\Delta$ is the sum of User Equipment Physical Downlink Shared Channel processing procedure time, User Equipment Physical Uplink Shared Channel preparation procedure time, Media Access Control processing time and a timing advance value.

5. The method of claim 4, wherein the User Equipment Physical Downlink Shared Channel processing time is determined by a User Equipment capability and a Physical Downlink Shared Channel Demodulation Reference Signal configuration.

6. The method of claim 5, wherein the Physical Downlink Shared Channel Demodulation Reference Signal configuration is a front loaded Demodulation Reference Signal plus additional Demodulation Reference Signal configuration.

7. The method of claim 4, wherein the User Equipment Physical Uplink Shared Channel preparation time is determined by a User Equipment capability.

8. The method of claim 7, wherein the User Equipment Physical Uplink Shared Channel preparation time is a predefined value with the weakest User Equipment capability.

9. The method of claim 2, wherein the timing advance command is received from a Media Access Control control element in Physical Downlink Shared Channel.

10. The method of claim 9, wherein $\Delta$ is the sum of User Equipment Physical Downlink Shared Channel processing time, Media Access Control processing time and a timing advance value.

11. The method of claim 10, wherein the User Equipment Physical Downlink Shared Channel processing time is determined by a User Equipment capability and a Physical Downlink Shared Channel Demodulation Reference Signal configuration.

12. The method of claim 11, wherein the timing advance adjustment gap is common for all Us User Equipments controlled by the same base station, and the Physical Downlink Shared Channel Demodulation Reference Signal configuration is a front loaded Demodulation Reference Signal plus additional Demodulation Reference Signal configuration.

13. The method of claim 11, wherein the timing advance adjustment gap is User Equipment specified, and the Physical Downlink Shared Channel Demodulation Reference Signal configuration is a front loaded Demodulation Reference Signal configuration or a front loaded Demodulation Reference Signal plus additional Demodulation Reference Signal configuration.

14. The method of claim 6, wherein the User Equipment Physical Downlink Shared Channel processing time is a predefined value with the front loaded Demodulation Reference Signal plus additional Demodulation Reference Signal configuration and the weakest User Equipment capability.

15. The method of claim 4, wherein the timing advance value is the maximum timing advance value provided in the timing advance command within a predefined range.

16. The method of claim 10, wherein the User Equipment Physical Downlink Shared Channel processing time depends on the capability and Physical Downlink Shared Channel Demodulation Reference Signal configuration of a corresponding User Equipment.

17. The method of claim 16, wherein the corresponding User Equipment is in a CONNECTED mode, and reports its capability.

18. The method of claim 10, wherein the timing advance value is a new timing advance value adjusted according to a previous timing advance value and the received timing advance command.

19. The method of claim 4, wherein the Media Access Control processing latency is a default value.

20. An apparatus, comprising:
a receiver that receives a timing advance command;
a processor coupled to the receiver that determines a timing advance adjustment gap based on the received timing advance command, wherein the timing advance adjustment gap is k symbols, and k is a nature number larger than one; and
a transmitter coupled to the processor that applies the corresponding adjustment of uplink transmission timing from k symbols later than the end of the physical channel carrying the timing advance command.

* * * * *